United States Patent [19]
Seth-Smith et al.

[11] Patent Number: 4,829,569
[45] Date of Patent: May 9, 1989

[54] COMMUNICATION OF INDIVIDUAL MESSAGES TO SUBSCRIBERS IN A SUBSCRIPTION TELEVISION SYSTEM

[75] Inventors: Nigel Seth-Smith; Cameron Bates; Samson Lim; William van Rassel; Robert Yoneda, all of Toronto; Keith Lucas, Ontario, all of Canada

[73] Assignee: Scientific-Atlanta, Inc., Atlanta, Ga.

[21] Appl. No.: 883,301

[22] Filed: Jul. 8, 1986

Related U.S. Application Data

[63] Continuation-in-part of Ser. No. 653,061, Sep. 21, 1984.

[51] Int. Cl.$^4$ .................... H04N 7/167; H04N 7/08; H04N 7/04
[52] U.S. Cl. .................... 380/10; 358/86; 358/142; 358/147; 358/149; 358/260; 358/294; 380/20
[58] Field of Search .................... 380/10, 20, 21, 43; 358/147, 256, 260, 294, 84, 86, 142, 149

[56] References Cited

U.S. PATENT DOCUMENTS

| | | |
|---|---|---|
| Re. 30,773 | 10/1981 | Glaser et al. |
| 3,728,480 | 4/1973 | Baer |
| 3,989,899 | 11/1976 | Norwich |
| 4,052,719 | 10/1977 | Hutt et al. |
| 4,205,343 | 5/1980 | Barrett .................... 380/18 |
| 4,225,884 | 9/1980 | Block et al. .................... 380/20 |
| 4,245,245 | 1/1981 | Matsumoto et al. .................... 380/20 X |
| 4,323,921 | 4/1982 | Guillou .................... 380/18 |
| 4,337,483 | 6/1982 | Guillou .................... 380/18 X |
| 4,388,643 | 6/1983 | Aminetzah .................... 380/20 |
| 4,393,404 | 7/1983 | Cox et al. .................... 358/147 |
| 4,484,027 | 11/1984 | Lee et al. .................... 380/21 |
| 4,484,217 | 11/1984 | Block et al. |
| 4,531,020 | 7/1985 | Wechselberger et al. .................... 380/21 |
| 4,536,791 | 8/1985 | Campbell et al. .................... 358/263 X |
| 4,595,950 | 6/1986 | Löfberg .................... 380/20 X |
| 4,599,647 | 7/1986 | George et al. .................... 380/20 X |
| 4,613,901 | 9/1986 | Gilhousen et al. .................... 380/20 |
| 4,623,920 | 11/1986 | Dufresne et al. .................... 380/10 X |

FOREIGN PATENT DOCUMENTS

| | | |
|---|---|---|
| 0149746 | 7/1985 | European Pat. Off. |
| 8601962 | 3/1986 | PCT Int'l Appl. .................... 380/10 |

OTHER PUBLICATIONS

Series 9700 B-MAC Digital Decoder 525-Line System, Technical Manual, Digital Video Systems Corp, DVS Part No. 707-042, 1987.

(List continued on next page.)

*Primary Examiner*—Stephen C. Buczinski
*Assistant Examiner*—Linda J. Wallace
*Attorney, Agent, or Firm*—Banner, Birch, McKie & Beckett

[57] ABSTRACT

A subscription television system in which individual decoders are enabled to receive individually addressed messages is disclosed. The composite signal, including video and teletext, also comprises addressed packets, which are detected by decoders and which indicate that a message addressed to a particular subscriber is forthcoming, and system control data. The decoder detects an addressed packet addressed to itself, whereby it is enabled to select the appropriate teletext message and to display the same. In a preferred embodiment, both address packets and teletext are encrypted. The addressed packet is decrypted using a decoder-specific code and a system key transmitted as part of the system control data, while the teletext packet is decrypted using the system key, but cannot be received until the addressed packet has been decrypted. Therefore, redundant levels of security are provided to the system. Messages for display to the user can be selected in response to user initiated commands, in response to decoder initiation, or in response to the transmitter. In each case, the bulk of the data to be displayed is repetitively transmitted by the transmitter and is adapted to the particular user after receipt by supply of user-specific information generated or stored by the decoder. In this way, the memory requirements of the decoder are substantially minimized, while extensive flexibility in the choice of messages to be transmitted is provided.

7 Claims, 10 Drawing Sheets

OTHER PUBLICATIONS

CCIR Study Group Report Document 10-11S-E, 9/23/83, "Satellite Transmission of Multiplexed Analogue Component (MAC) Television Signals".

Journal of the SMPTE, 10/84, Gerald Chouinard and John N. Barry, pp. 930-942, "NTSC and MAC Television Signals in Noise and Interference Environments".

ORACLE, SMPTE Journal, vol. 83, 1/74, by G. A. McKenzie, pp. 6-10, "An Information Broadcasting Service Using Data Transmission in the Vertical Interval".

Wireless World, 5/73, p. 222, "TV Information Service Signal Format for B.B.C. System".

Wireless World, 7/73, pp. 314-316, by A. James, "ORACLE-Broadcasting the Written Word".

SMPTE Journal, 11/84, pp. 1034-1043, by John D. Lowry, "B-MAC: An Optimum Format for Satellite Television Transmission".

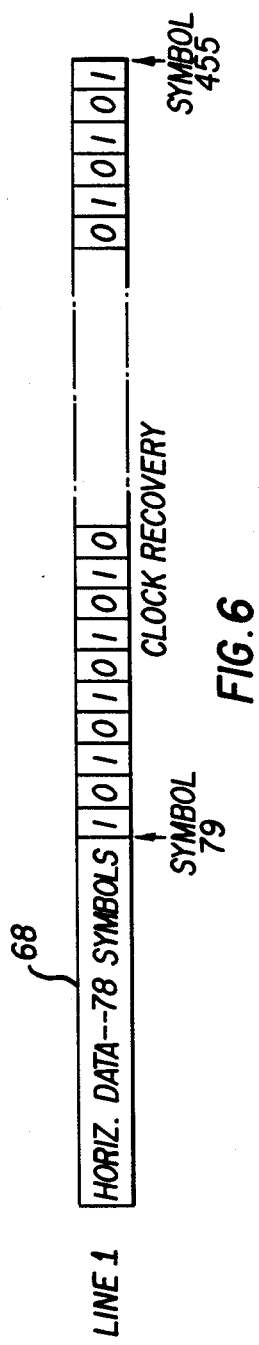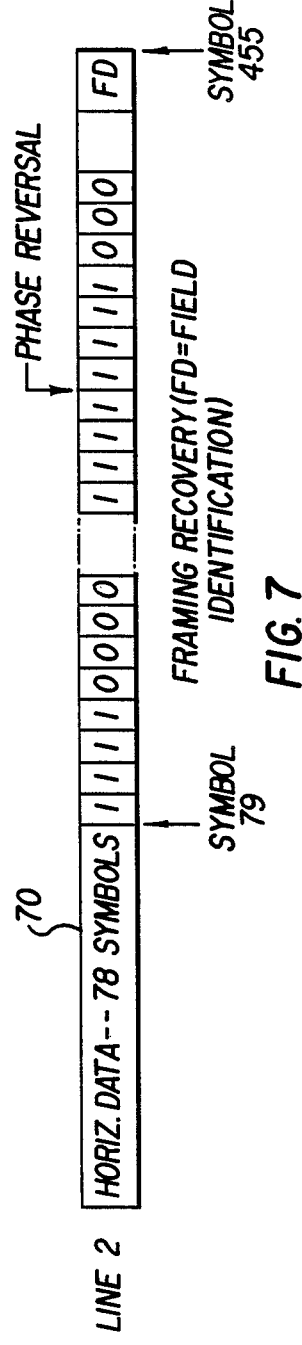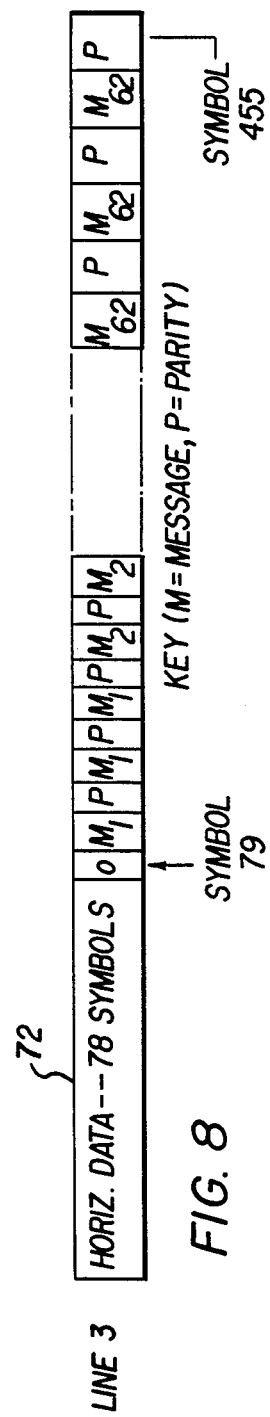
FIG. 6
FIG. 7
FIG. 8

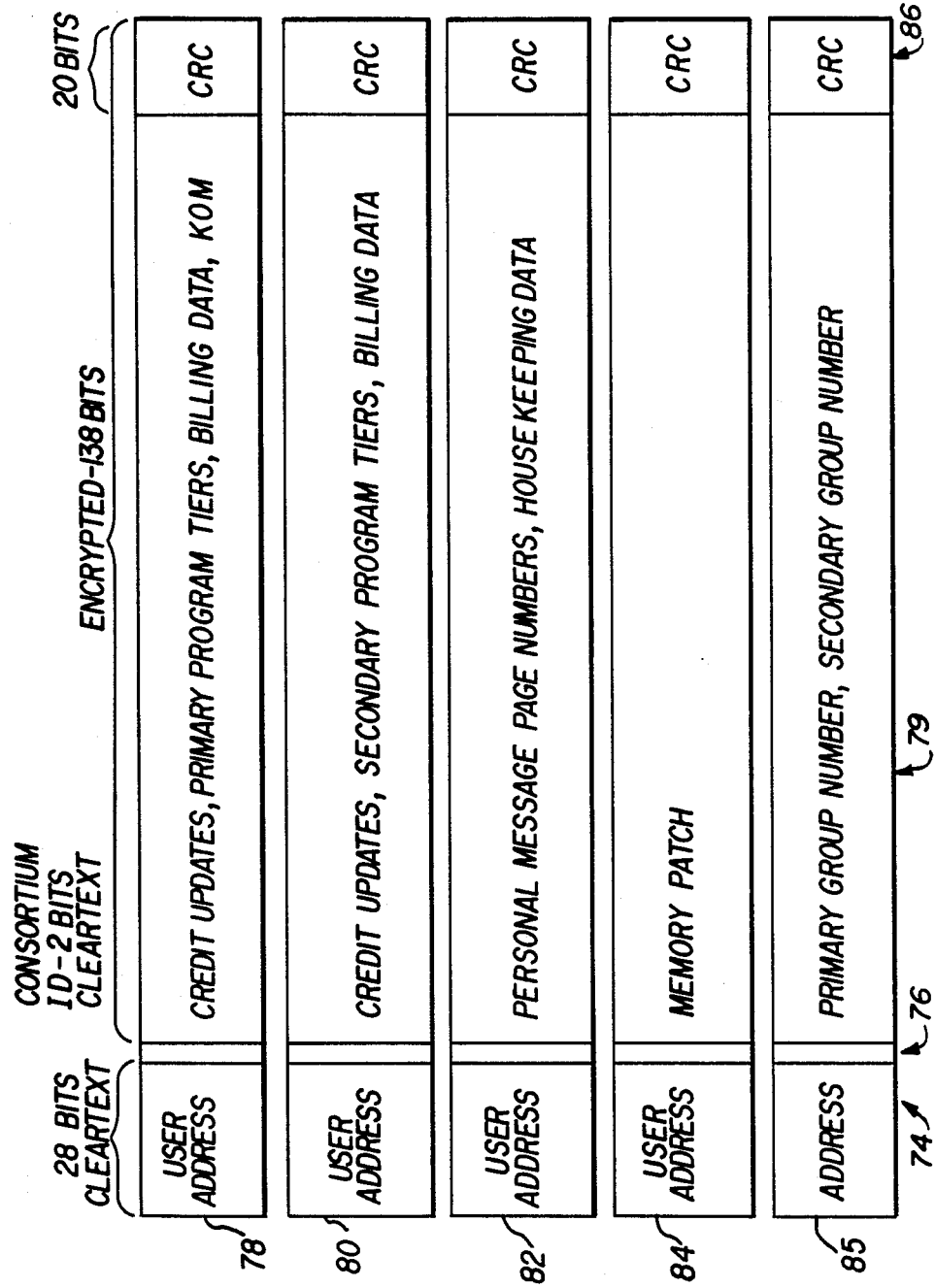

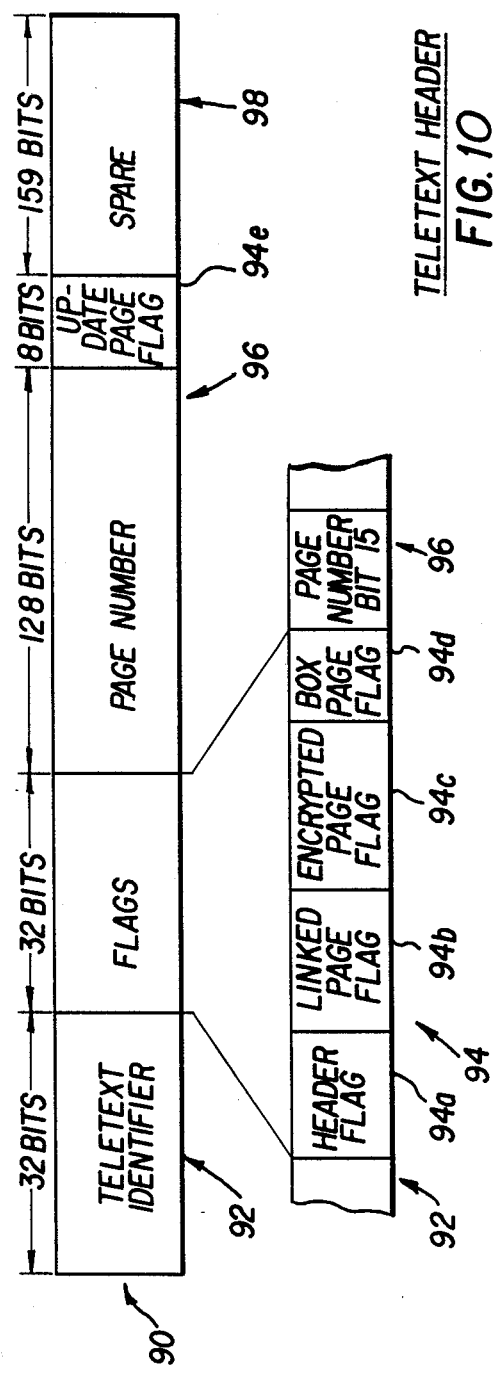
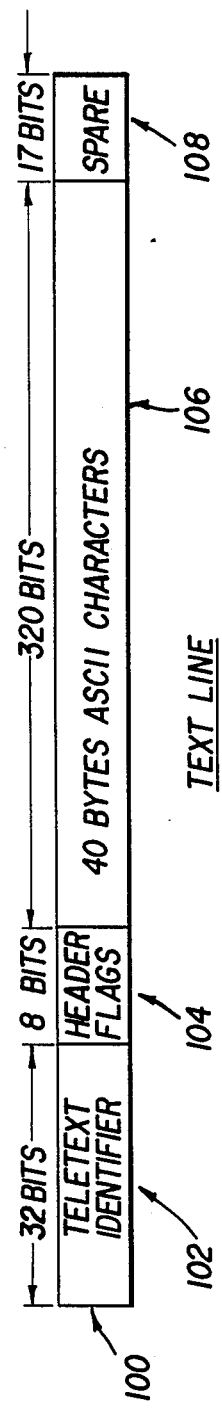
FIG. 10 TELETEXT HEADER
FIG. 11 TEXT LINE

COMMUNICATION OF INDIVIDUAL MESSAGES TO SUBSCRIBERS IN A SUBSCRIPTION TELEVISION SYSTEM

This application is a continuation-in-part of U.S. application Ser. No. 653,061, filed Sept. 21, 1984 in the name of Keith Lucas and entitled: "Information Display Scheme for Subscribers of a Subscription Television System".

FIELD OF THE INVENTION

This application relates to improvements in subscription television systems. More particularly, the invention relates to apparatus and methods for communicating individually addressable text messages from a central location to individual subscribers of a subscription television system.

BACKGROUND OF THE INVENTION

The sophistication of communications systems involving subscription television is continually increasing. The systems being installed at this time have greatly improved communications flexibility as compared to those previously in use, while the quality of the transmitted signal is continually being improved, as is flexibility in the business arrangements possible between the subscriber and the broadcaster.

For example, in U.S. Pat. No. 4,484,217 to Block et al., there is disclosed a subscription television system in which all billing calculations are carried out at the decoder, that is, at the individual subscriber's location. When a subscriber makes a payment, e.g., by simply mailing a check to the broadcaster, the broadcaster then sends a message which is detected by that particular decoder and used by it to update the user's credit and/or account balance information. The decoder then controls whether the user is to have access to a particular program or not in accordance with this billing information, possibly also in accordance with other sorts of access controls transmitted by the broadcaster. For example, each program transmitted may include an indication that it belongs to a particular "tier" or class of programs. The decoder then permits access to the program if programs of that tier had previously been authorized.

The Block et al. patent also discloses that teletext data, that is, textual information relating to stock market reports and the like, could also be transmitted using this system. However, the teletext data discussed in the Block et al. patent appears to be system-wide data, that is, data relevant to all subscribers of the system more or less equally. The Block et al. patent does not teach any way in which, for example, an individual broadcaster may send a chosen subscriber a personal message other than billing update data, as above.

"Specification of Standards for Broadcast Teletext Signals," a document published by the British Broadcasting Corporation et al. in September, 1976, describes the teletext broadcasting system in effect in the United Kingdom. According to this system, teletext information such as closed-captioned programming is available for the hearing-impaired. According to this system, as understood by the applicants, the subscriber simply depresses a button on a key pad comprised by the decoder, and the decoder then selects alphanumeric data which is transmitted during the vertical blanking interval of the standard television signal. The decoder can then add this closed-captioned textual material directly to the video screen, so that it can be seen by the hearing impaired. Again, however, this material is transmitted system-wide, and there is no provision made for transmission of individual messages to individual subscribers.

Those skilled in the art will recognize that there are a number of constraints on the operation of any successful subscription television system. For example, there must be an extremely reliable and trustworthy method of computing charges to be billed to the subscriber and for communication of credit status updates. It is also desirable that the subscriber be permitted to prepay for certain classes of service, for example, to have access to a particular broadcaster's offerings. On the other hand, it is also desirable that an "impulse" purchase system be provided such that the viewer could purchase a particular program on a "pay-per-view" basis when desired. Similarly, it is desired that a running list of programs purchased by the subscriber be available, such that he can confirm that he is indeed being billed correctly. It is furthermore desired that means be provided for securing the system against improper use, which includes both prevention of viewing of inappropriate subject matter and purchase of fee-bearing material by persons not authorized to do so.

The requirement that the credit status be updateable further requires that communication be possible in both directions between the decoder and the transmitter. However, it would be inefficient to provide individual uplink transmission facilities at each decoder, for example, in a satellite TV system. Therefore, it is desirable that a two-way communications facility be provided connecting each decoder with the transmitter, but in which the two data links are not made using the same medium. Therefore, the communication facility which carries subscription television signals from the transmitter to the decoder is not the same as that used to carry payment status information, queries or the like from the decoder to the transmitter.

As indicated above, the prior art suggests that individual decoders can be addressed for transmission of billing information. It would also be desirable if individual user messages could be transmitted to individual users such as to provide an additional communications facility not previously made available. If this is to be done, there are several criteria which must be met. Paramount among these is security; preservation of the secrecy of the message and its availability only to the particular addressee is of utmost importance. At the same time, it is desired to be able to address messages to classes of subscribers, for example, to transmit civic data or the like.

Another complexity in providing a secure subscription television system is the fact that the decoder cannot be considered to be in "friendly hands." That is, unlike an encrypted data channel as used by financial institutions or in military applications, in which both transmitter and receiver are in friendly hands, an additional security exposure which must be faced in connection with a television system is analysis of the transmitted signal. In a subscription television system, the transmitted signal must, of course, be protected, as a very important threat is posed by viewers who have purchased a decoder and attempted to modify it to bypass the security mechanisms the billing arrangements or the like. A further problem is posed by those who would make copies of, for example, television movies using videotape recorders or the like for subsequent viewing or resale.

It is, therefore, desirable that a system be provided which provides a very high level of security, both as to the transmitted signal and as to the operation of the decoder, and one in which some sort of "fingerprint" identifying the source of an unauthorized copy can be provided.

SUMMARY OF THE INVENTION

It is therefore an object of the invention to provide a subscriber television system in which individual text messages may be directed to individual subscribers.

It is a further object of the invention to provide a subscription television system in which individual text messages can be transmitted to individual subscribers, in which the message can only be received by the proper receiver and in which the text is very heavily protected against improper receipt, that is encrypted, such that it can only be received and decrypted at the correct decoder, thus providing an additional level of security to the message handling system.

It is a further object of the invention to provide a subscription television system in which an individual message can be sent to an individual user, but in which the individual decoder is enabled to receive and decrypt the specified message only upon activation by the proper individual.

It is a further object of the present invention to provide a subscription television system in which all billing information is generated at the decoder. The transmitter can transmit indication of receipt of payment and of additional charges not originating at the decoder to the decoder, such as sign-up fees. The decoder is thus enabled to generate the bill. Ultimately, the handling of billing operations is greatly simplified and paperless billing is made possible.

It is a further object of the present invention to provide a television subscription system in which a wide variety of teletext messages having specified formats are available for use by the decoder, in which the formats can be varied at the transmitter's option, yet in which the memory required at the decoder location is minimized, to realize economy of construction of the decoder unit.

A further object of the invention is to provide a subscription television system in which the identity of a particular decoder used to decrypt a program can be determined from recordings made using such a decoder.

A further object of the invention is to provide a subscription television system in which individual text messages can be received by individual subscribers in response to queries by the subscriber, in response to the desire of the broadcaster, or upon initiation by the decoder itself.

The above needs of the art and objects of the invention are met by the present invention, which comprises a system and method for communication of individual text messages to individual subscribers of a subscription television system. According to the invention, a number of distinct "lines" of information are transmitted during each vertical blanking interval of the video signal. A number of these lines are referred to as "addressed packets," while another group of lines includes teletext information. The addressed packets include identification of individual subscribers which are transmitted in clear text (that is, are not encrypted) such that the individual decoders recognize their own numbers. The addressed packets include certain cipher information, used in decrypting other portions of the information contained in the vertical blanking interval and the video signal. The addressed packet also indicates that a particular "page" of teletext information is being transmitted which is directed to a particular subscriber. The decoder, having detected existence of a message addressed to it responsive to the information contained in the addressed packet, then selects subsequently transmitted teletext "lines" included in subsequent vertical blanking intervals, and uses these to assemble a teletext "message" which can then be displayed on the user's television screen.

In a preferred embodiment, the broadcaster continually sends teletext information which is useful in subsequently assembling messages. The teletext information repetitively transmitted includes "templates." For example, should the subscriber seek to ascertain his billing status, he will so indicate by pressing a button or buttons on a user key pad comprised by his decoder. A microprocessor comprised in the decoder will note this request and determine the number of a template suitable for displaying this information. When that page of text is subsequently transmitted, as part of the regular sequence of teletext messages, the microprocessor selects it, and then completes the template by filling in various dollar amounts and the like unique to the particular subscriber. This completes assembly of the billing report requested. The microprocessor then can display the complete billing report. In this way, the teletext information comprised in the template, that is, the information needed for the text message which is not user specific, such as column headings, current dates, the broadcaster's name and address, which is common to all subscribers, need not be stored at the user location. This greatly reduces the amount of memory which must be provided for each decoder. In the same way, the templates can be varied by the broadcaster, e.g., to update the listing of services made available or the like.

The microprocessor itself can also generate various reports, for example, to indicate to the subscriber that his credit is running low. The microprocessor can select a template page from the sequence of template pages continually being sent by the broadcaster and can complete it with user-specific billing information, all as generally discussed above.

In this way, it will be observed that there are three different ways of providing a teletext message, that is, user-initiated, broadcaster-initiated, and decoder-initiated.

Finally, the system of the invention includes means for "fingerprinting" copies of program material made by a subscriber in derogation of the rights of the copyright proprietor. The address packet includes a flag which may be set to cause the decoder to add the decoder identification number to one particular video frame of the film being shown. The addition of the user identification is generally imperceptible to the user, but will show up on any copies of the film that are being made. Should the broadcaster thereafter locate such an unauthorized copy, he can read the user's identification and thereafter cut off service to that individual or take other appropriate action.

BRIEF DESCRIPTION OF THE DRAWINGS

The invention will be better understood if reference is made to the accompanying drawings, in which:

FIG. 6 shows in some additional detail the clock recovery data carried in line 1 of the vertical blanking interval;

FIG. 7 shows in additional detail the framing recovery data carried in line 2 of the vertical blanking interval;

FIG. 8 shows the arrangement of the system data carried in line 3 of the vertical blanking interval;

FIG. 9 shows the general arrangement and contents of four different types of addressed packets which can be transmitted in lines 4-8 of the vertical blanking interval;

FIG. 10 shows the outline of a teletext header line which can be transmitted in any one of lines 9-13 of the vertical blanking interval;

FIG. 11 shows a text line, that is a line of teletext which may be transmitted during any one of lines 9-13 of the vertical blanking interval;

DESCRIPTION OF THE PREFERRED EMBODIMENTS

As mentioned above, it is an important object of the present invention to provide a communications system in which individual text messages can be transmitted to individual subscribers in a subscription television system. This is to be accomplished without adding unduly to the complexity of the system or its cost, and without requiring any sort of uplink communication between the decoder and the transmitter. Moreover, the system is to be provided with unprecedented flexibility in choice of program by both the broadcaster and the dealer, and the subscriber billing is to be substantially automated and performed at the decoder. Finally, the whole system is to be menudriven, that is, the subscriber is to be directed in operation of the system by messages displayed on his television screen.

These objects of the invention are achieved by the present system, which is described in the following text, of which the following is a Table of Contents, and in which reference is made to the accompanying drawings.

A. System Overview

Figure 1:
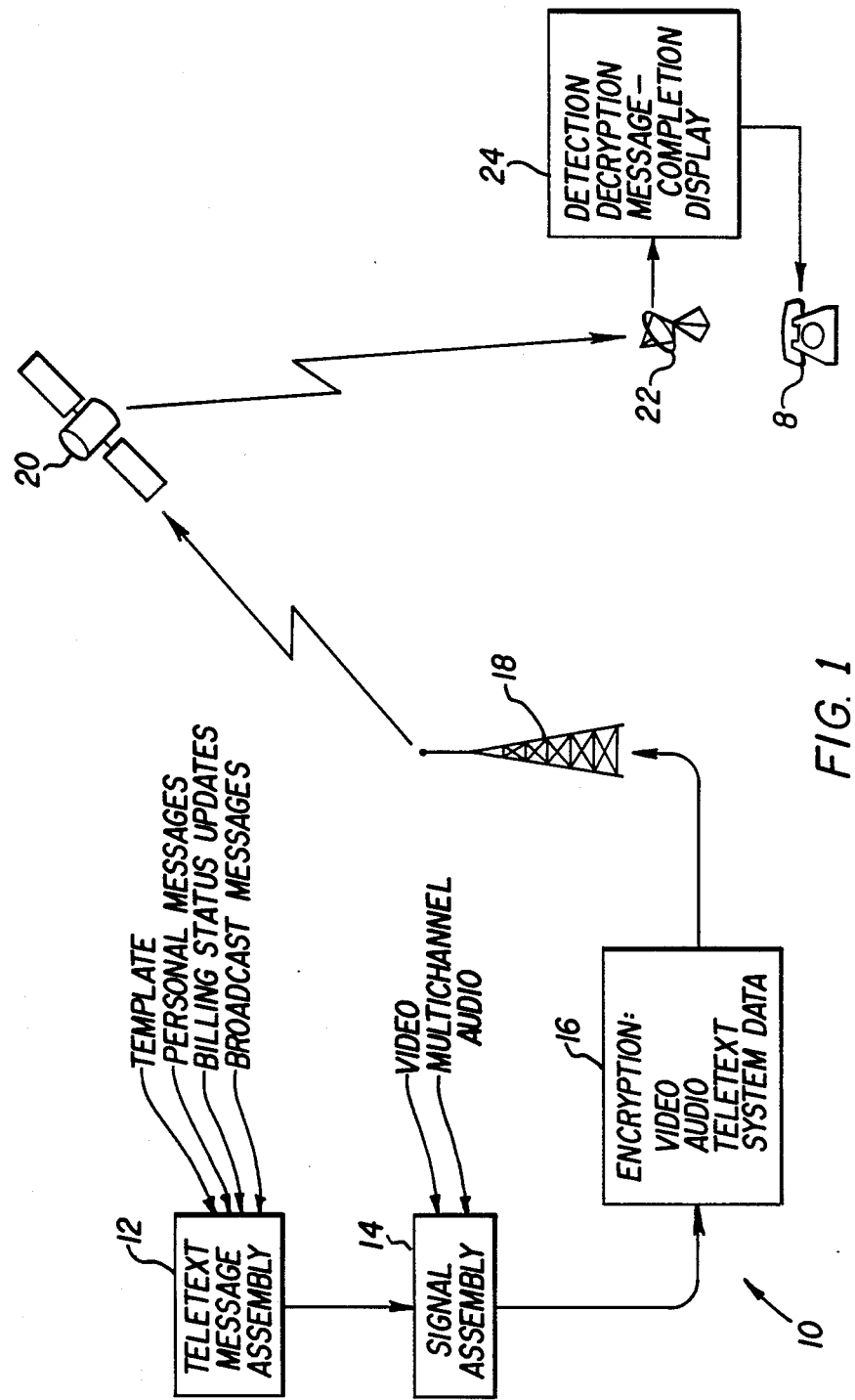
FIG. 1 shows an overall view of a communication system according to the invention.

FIG. 1 shows in highly schematic form a communication system suitable for achieving the objects of the invention listed above. At a first transmitter location, indicated generally by the numeral 10, the teletext message sequence is first assembled as indicated at 12. This may include standard items such as templates, that is, data which provides a format within which user-specific information can be added by a decoder to personalize a message; personal messages directed to individual users; billing status updates, that is, billing information generated in response to a telephone call or letter from the subscriber to the broadcaster; and broadcast messages, that is, messages which are out of the ordinary course of business, but which are transmitted to substantially all or a predetermined subcategory of subscribers (e.g., that there is some general danger of which all should be aware).

At 14, the teletext information from item 12 is assembled together with video information, and in a preferred embodiment of the system of the invention, with multichannel audio. As will be detailed below in connection with FIGS. 3 and 4, six channels of digital audio are provided in the system of the invention. These are transmitted during the horizontal blanking interval and may be provided on a pay-per-listen basis, whereby the broadcaster can generate additional revenue from audio transmission.

At 16, the assembled teletext, video and audio signal is encrypted and/or scrambled. The encryption is done according to a relatively sophisticated procedure which is discussed below in connection with FIG. 15. Suffice it to say at this point that the signal transmitted includes what are referred to as addressed packets, which among other functions alert an individual subscriber's decoder that a message has been sent to it, and teletext information. The subscriber identification portion of the addressed packet is transmitted in clear text, that is, is not encrypted, so that it can be detected without decryption. The addressed packet further contains certain cipher key information used in decrypting system control data. The system control data in turn includes cipher information required for decryption of encrypted user messages. Thus, a double level of security is provided, as only the individual decoder can even receive the encrypted message, and only that decoder can use the system data which it must also receive to decode the individual message, which is subsequently sent. The composite, encrypted signal is transmitted as indicated at 18. It may travel via a satellite 20, by a landline or a combination of both to receiving antenna 22. It is there passed to a decoder which comprises means for detecting the signal, decrypting the encrypted portions of it, completing any messages requiring any subscriber-specific data, such as billing status information and the like, and display of the received messages. Of course, the decoder also permits user selection of the decrypted audio and video information, and includes means for maintaining the billing history information related to a specific user, for restricting access of individuals to the video signal, prevention of impulse purchase of programs by those not authorized to do so, and so on, all as detailed below.

The system of the invention is completed by means permitting the user to communicate with the broadcaster. Ordinarily, the user will only need to communicate with the broadcaster sporadically, for example, to request addition of a service, or to pay a bill or the like. Conventional communications facilities such as the telephone system or the mails are suited for this function, as indicated schematically at 8. In this way, no uplink facility at the user's station need be provided.

1. The Communications Format Employed

Figure 2:
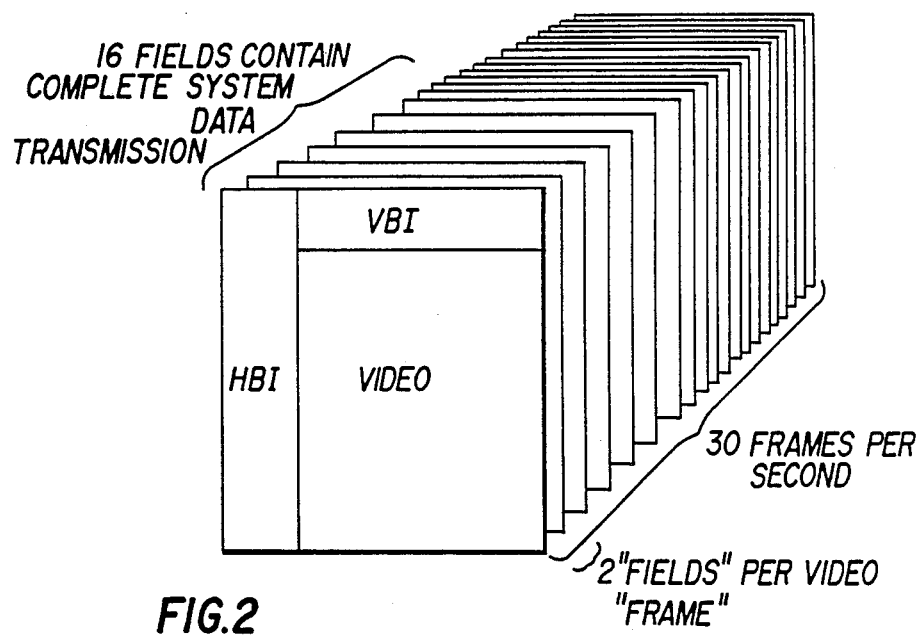
FIG. 2 shows an overall view of the video format according to the invention, and explains certain nomenclature used for understanding the system of the invention.

FIG. 2 shows the overall transmission format of the system according to the invention. As is conventional in television, 30 "frames" each comprising a still image are transmitted per second as indicated. Each frame includes two "fields," as also shown. In a preferred embodiment of the invention, the video encoding scheme employed is that referred to generally as "B-MAC." This is an acronym for type B format, Multiplexed Analog Component system. "Type B" refers to the fact that data is carried integral to the video signal. See generally Lowry, "B-MAC: An Optimum Format for Satellite Television Transmission," *SMPTE Journal*, November 1984, pp. 1034–1043, which discusses in detail the B-MAC format and explains why it was chosen over various competing systems.

According to the present invention, the vertical blanking interval (VBI) of each field contains certain "system data" necessary for operation of a subscription television system according to the invention, as well as addressed packets and teletext lines used to carry data needed for the operation of individual decoders and for transmission of messages to individual subscribers. In the preferred embodiment of the present invention, the vertical blanking intervals of 16 total fields are used for complete transmission of all system data required, which includes an encryption key which is changed every 16 fields, that is, on the order of three times per second. As also shown in FIG. 2, each line also includes a horizontal blanking interval (HBI). During the HBI are transmitted six channels of high quality digitally-encoded audio information, with error correction, such that the decoder can also be used to supply a high quality audio signal. This can be used to provide the audio component of the corresponding video signal (or several versions thereof, in different languages) or an additional audio signal, such that subscription audio is also made available according to the system of the invention.

2. The Horizontal Blanking Interval

Figure 3:
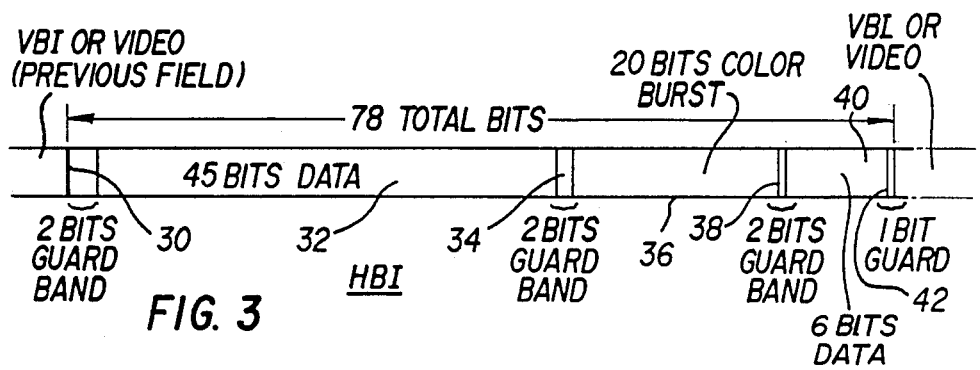
FIG. 3 shows in broad outline the format of the horizontal blanking interval.

FIG. 3 shows the format of the horizontal blanking interval (HBI). In the preferred embodiment, the HBI consists of 78 total bits of four-level frequency-shift-keyed (FSK) data. The HBI is interposed between vertical blanking interval or video information from a previous line and that of the present line. A typical horizontal blanking interval as shown begins with a two-bit guard band 30, followed by 45 bits of audio and utility data 32, a second two-bit guard band 34, twenty bits of color burst information 36, a further guard band 38, six more bits of data 40 and a final guard band 42, after which the VBI or the video signal of the particular frame commences. The position of the color burst 30 within the HBI varies, to provide signal scrambling; descrambling involves the use of a repetitively-transmitted key, described below in connection with FIG. 8. (The actual number of bits of data in each HBI can also be varied pseudo-randomly, for further security; the average number is fifty-one.)

Figure 4:
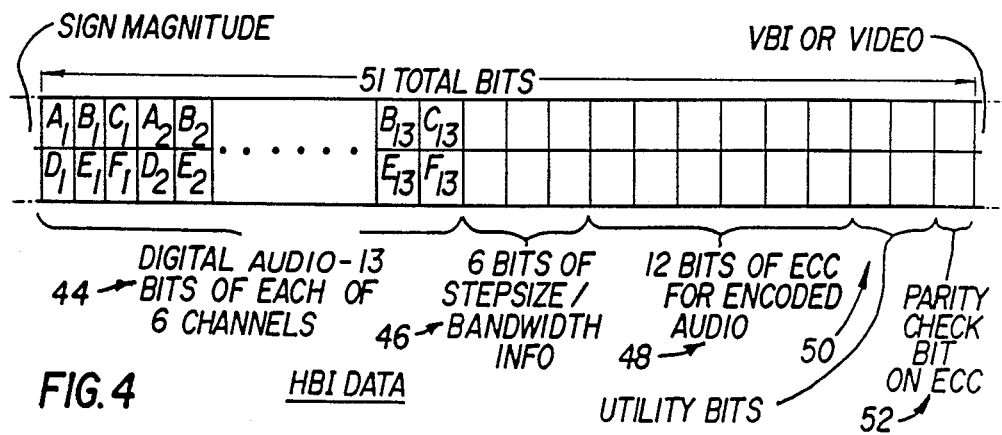
FIG. 4 shows additional details of the format of the horizontal blanking interval.

FIG. 4 shows some additional details of the horizontal blanking interval data 32 and 40 shown in FIG. 3. In the example shown, fifty-one total bits of data are provided in each line of the HBI, and each bit is four-level FSK encoded, such that each bit period includes transmission of two bits. One bit can be referred to as sign and the other as magnitude as indicated on FIG. 4. As shown, the first seventy-eight bits are digital audio; thus each frame provides a thirteen-bit digital representation of a sample of each of six audio channels. High quality transmission of audio frequencies up to approximately 15 kHz is thus provided. Following the audio information are six bits of stepsize and bandwidth information. The stepsize bits indicate the size of the steps numbered by the thirteen bits of information preceding, and the bandwidth information relates to the amount of the amount of emphasis or de-emphasis of the signal employed. Alternate fields carry the stepsize and bandwidth data. Both these terms are used as conventional in the Dolby delta modulation scheme, which is employed in the preferred embodiment of this invention for transmission of the audio. Following are twelve bits of error correction code (ECC) for correction of the audio, indicated at 48. Four utility bits follow at 50, and the last bit 52 of the data are a parity check bits for checking the parity of the error correction bits 48.

Additional details concerning the horizontal blanking interval format can be found in co-pending Ser. No. 883,310, filed July 8, 1986, incorporated herein by reference.

3. Vertical Blanking Interval

Figure 5:
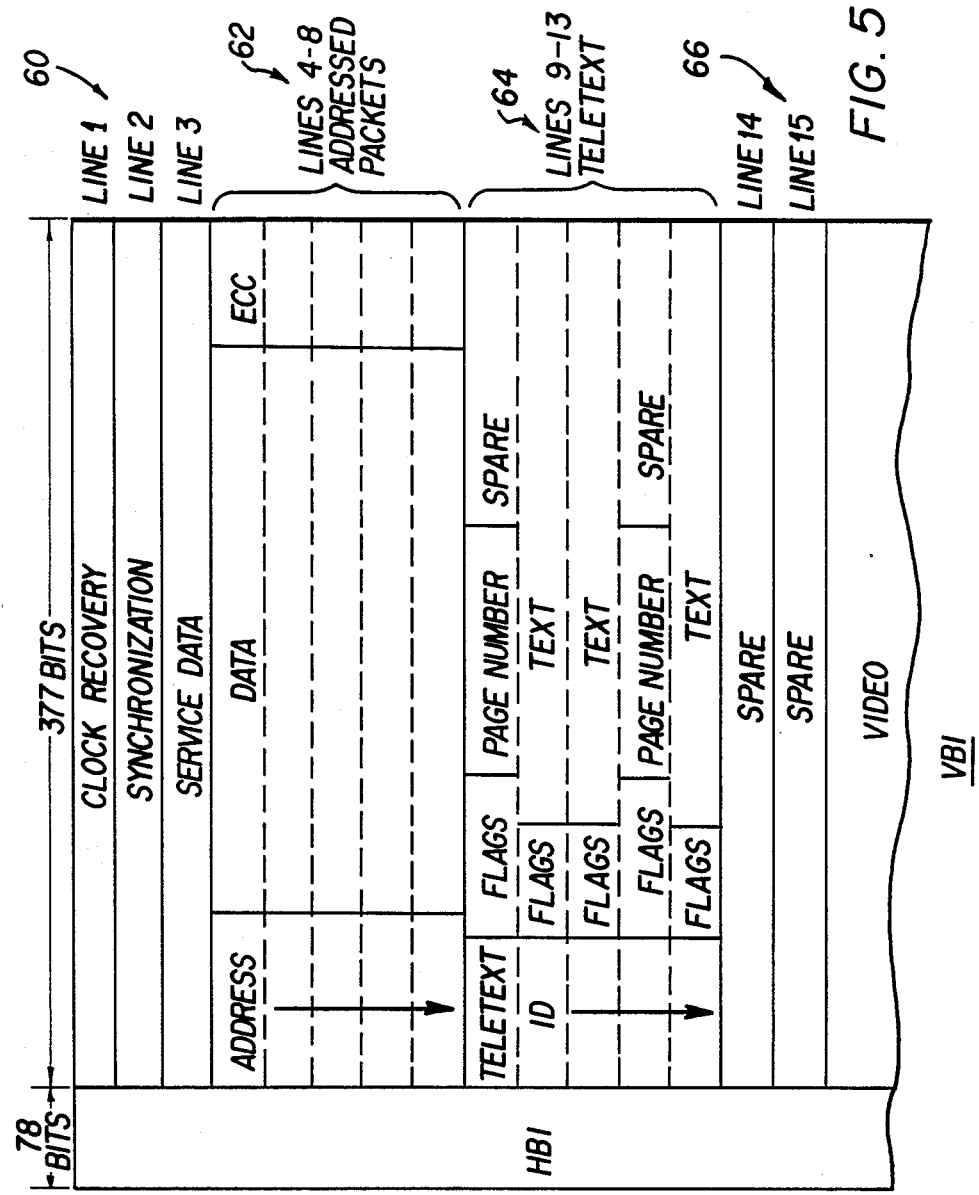
FIG. 5 shows an overview of the material carried in the 16 lines of the vertical blanking interval in a 525 line embodiment of the invention.

FIG. 5 shows the arrangement of the lines which make up the vertical blanking interval (VBI). The VBI includes 16 lines in the 525-line NTSC version of this invention. A slightly different number of lines are used in the 625-line PAL embodiment of this invention.

The functions of the lines and their arrangement in other respects are identical. Discussion of a specific number of lines herein therefore should not be taken to limit the invention, except as specifically required.

As indicated, the vertical blanking interval is 377 bits wide. These bits are two level FSK encoded as compared to the four level FSK scheme used in the HBI as discussed above. Lines 1, 2 and 3 include the transmission of clock recovery, synchronization and system service data, as indicated in FIG. 5. The detailed formats of these lines and the use of the information contained therein is discussed in co-pending application Ser. No. 704,024, filed Feb. 21, 1985, incorporated by reference herein, and in Ser. No. 883,310, filed July 8, 1986. Their functions are discussed briefly below in connection with FIGS. 6–8.

For the purposes of the present invention, the significanant data contained in lines 1–3 is a system key which is updated every sixteen frames, that is, which changes with each complete system data transmission as indicated above in connection with FIG. 2. The system key is common to all decoders. The system key is contained in the service data of line 3, and is used for decryption of video program material, audio and teletext together with additional less frequently transmitted, but individually varied cipher data, as well as invariant individual decryption ciphers. This arrangement provides substantial system security. Operation of this system is described further below.

Lines 4–8 of the VBI include the addressed packets, as indicated by reference numeral 62. As noted, these each contain an address which is then followed by data, concluding with error correction coding (ECC). The addresses are those of the individual decoders. The addresses in the address packets are transmitted in clear text, such that they can be received without decryption by the receiver. The remainder of the message is encrypted. In this way, addressed packet data, which is very significant to the proper functioning of the system because one of the addressed packets includes one of the decrypting ciphers needed, is provided with a high degree of security. Addressed packets addressed to differing decoders may be transmitted in a single field.

As indicated at 64, lines 9-13 of the VBI are used to transmit teletext. The first part of each teletext line is a teletext identification which indicates that the line in fact is teletext. As shown, two types of teletext lines are used. Teletext headers include a relatively larger number of flags, and indicate which of the following teletext lines are part of a particular "page" or message. The text lines themselves include a somewhat lesser number of flags and text data; typically forty ASCII-encoded bytes are sent per text line, and up to twenty lines can be displayed on the user's screen at once. Finally, lines 14 and 15 indicated at 66 are not used in the presently preferred embodiment of the invention.

As mentioned briefly above, FIG. 6 shows in additional detail the clock recovery data of line 1 of the VBI. As indicated, its first portion 68 is the seventy-eight symbols of the HBI. Thereafter, line 1 includes a series of 1's and 0's which are used to synchronize the clock of the decoder, as discussed in the co-pending applications referred to above.

FIG. 7 shows line 2 which is used for framing recovery, that is, for synchronization of the video signal. Again, the first portion 70 is the seventy-eight symbols of the HBI data; this is followed by framing recovery data, which consists of two repetitively transmitted eight bit sequences. One is the inverse of the other; the change from one to the other is made at the point marked "phase reversal." As described in the co-pending applications referred to above, this line is used for framing recovery, i.e., for correct synchronization of the received video signal.

FIG. 8 shows in some additional detail the makeup of line 3; again, it begins with the seventy-eight symbols of HBI data indicated at 72, followed with a bit which is not used, and a number of message bits, each of which is immediately followed by a parity bit. As discussed more fully in co-pending application Ser. No. 883,310, filed July 8, 1986, the message bits shown in line 3 of FIG. 8 are each repeated three times and are each protected by parity bits, such that of some 378 total bits, only sixty-two bits of useful data are provided. This data comprises the "system data" used by the subscription television system of the invention to keep control of a wide variety of system functions. Three different versions of line 3 are required to transmit all the system data needed, and each is transmitted in five successive fields, such that the total system data transmission consumes fifteen total field transmissions. A sixteenth field is not used for transmission of system data. Most pertinent to the present invention is the fact that the system data transmitted in line 3 includes a service key which is changed every 16 frames, i.e., on the order of three times per second. This service key must, of course, be accurately received for the decoder to work properly. Therefore, it is transmitted redundantly, as outlined, and in combination with extensive parity-based error correction, all as discussed in the co-pending applications referred to above, to ensure correct reception of the service key, as well as the other system data.

As indicated in co-pending application Ser. No. 736,305, filed May 21, 1985, the key contained in line 3 is also used to unscramble the location of the color burst signal occurring during the HBI, which varies from the exemplary position shown in FIG. 3. This additional scrambling provides a further measure of security to the system according to the invention.

B. Transmission of Subscriber Messaqes

It will be appreciated by those skilled in the are that the communications system of the invention requires certain data to be transmitted system-wide, that is, that all the decoders must receive certain information, while other information should be transmitted only to individually addressable decoders. Furthermore, it will be appreciated that some data, such as data identifying the program material currently being transmitted or constantly changing ciphers, needs to be transmitted repetitively, over and over again, while other data need only be transmitted infrequently or upon a single occurrence.

According to one important aspect of the present invention, data which must be transmitted system-wide and/or repetitively is transmitted as part of the system data in line 3, whereas data transmitted to individual decoders of groups of decoders or infrequently is transmitted as part of the addressed packets appearing in lines 4-8. As mentioned above, three different versions of line 3, which together include all system data, are transmitted during the "cryptocycle" which is completed every sixteen frames, i.e., approximately every one-third second. The system data may include a "fingerprint" bit. When detected, this bit causes the user identification number to be copied to the display for a single frame, such that any reproduction made of the program being transmitted at that time will include the user identification. This enables tracking down of the source of illegal copies. Other system data includes a service key required for decrypting the video signal; this service key is changed every sixteen fields which makes it difficult to obtain illegally.

Other information repetitively transmitted as part of the system data includes the program tier number, that is, an indication of the tier to which the program being transmitted on a particular channel at that time belongs. The tier concept is used to separate various classes of programming transmitted by the transmitter. The user then selects which tiers of programs he chooses to watch, e.g., sports programs, special features, premium movies, and the like. The user indicates which tiers he wished to view to the broadcaster, e.g., by telephone or by letter, and the broadcaster transmits indication of the tiers selected by the user to the user's decoder individually as part of an addressed packet. The individual decoders use the tier number transmitted as part of the system data to either en able or disable the viewing of a particular program at a particular time. The distinction between system data and addressed packet data is thus illustrated: The program tier number relates to the particular program being transmitted by the broadcaster at a given time and thus clearly should be transmitted to all decoders. On the other hand, the primary and secondary program tiers, which terms refer to the tiers selected by and paid for by the subscriber, are transmitted individually as part of the addressed packets, thus enabling the decoder to determine which programs it should allow the viewer to see.

As described above, a primary aspect of the invention described and claimed in the present application is the transmission of individually adressable, encrypted messages from a transmitter to an individual decoder for display to the subscriber. As has been described previously, this is done by using an addressed packet to indicate to an individual decoder that a personal message for the subscriber is to be found in a forthcoming frame. The individual decoder is thus alerted to select that teletext message when it is subsequently transmitted.

1. The Addressed Packets

FIG. 9 shows four types of addressed packets which are made available in a presently preferred embodiment of the invention. Their formats, and the various items of information shown on FIG. 9 as being transmitted by each can, of course, vary as needed, depending on the specific requirements of communication between the transmitter and individual decoders. Therefore, these particular addressed packets should not be considered exclusive or as a limitation on the proper scope of this invention.

The 377 bits of each of the addressed packets are encoded such that they can decoded by a one-half rate forward error correcting code. This reduces the number of useful bits to 188, which is the total appearing in each of the several possible addressed packets shown in FIG. 9. In each case, the first twenty-eight bits, indicated generally at 74, are the subscriber or user address which is transmitted in clear text, that is, is not encrypted. This acts as a label for recognition by the target decoder. The twenty-eight bit user address allows a maximum of 268,000,000 decoders to be addressed by an individual broadcaster. A non-encrypted two-bit consortium identification 76 is also provided in each of the addressed packets. This identifies a broadcaster or a group of broadcasters. The remainder of the addressed packet is encrypted, as indicated. This includes 138 bits of various keys, credit updates and program tiers which the subscriber's decoder is authorized to access, and twenty bits of cyclic redundancy check data for error detection and correction of the 138 bits just described. Four of the encrypted bits, possibly in conjunction with the consortium identification bits, identify the addressed packet format of a particular line.

The data transmitted in the addressed packet can vary quite widely, as indicated generally in FIG. 9, and as further detailed in Ser. No. 883,310, filed July 8, 1986. For example, in a first addressed packet 78, the "message portion" 79 of the addressed packet may include credit update information, may identify the primary program tiers, that is, the classes of programming for which the subscriber has paid and therefore is entitled to view, other billing data, and importantly the key-of-the-month (KOM). The KOM is critical to the decryption of program data, as will be described below. In essence, this is a lengthy sequence of bits which is used in connection with particular decryption hardware described below in connection with FIG. 15. The KOM is varied once per month, and is used together with a secret serial number which is permanently written into memory comprised by the decoder assembly. The key-of-the-month is the same for all decoders, but is individually transmitted to each. This allows deauthorization of individual decoders as needed by the broadcaster. The key-of-the-month is used together with the secret serial number of each of the individual decoders to provide a decryption key which is unique for each decoder. As will be appreciated by those skilled in the art, this provides a very high level of security to the system. It also requires that the key-of-the-month be reliably detected by the decoder.

In order to accomplish this goal, the primary addressed packet 78 is transmitted on a regular basis throughout the month, e.g., on the order of once every hour or so. In the preferred embodiment of the decoder of the invention, the "intelligent" portion of the system is always enabled, whether or not the subscriber is actually watching his television at the time, such that the key-of-the-month is reliably received, even if the subscriber rarely watches television. The key-of-the-month for a subsequent month can also be transmitted so as to be received in advance of the first day of the month so that no service interruption is likely to occur; a key-of-the-month odd/even bit transmitted as part of the system data is used to indicate which is to be used to decrypt particular program material.

Other aspects and uses of the primary addressed packet 78 will appear as the discussion of the invention proceeds.

A second addressed packet format is shown at 80. This addressed packet is transmitted regularly only if the consortium wishes to make use of more than than forty program tiers which can be separately identified within the primary addressed packet 78. If it is used, it may also include credit update information and other billing data as indicated, as well as the secondary program tier information shown.

Other addressed packets are shown at 82 and 84. These may contain a variety of data as indicated. For example, a third format shown at 82 may include personal message page numbers and system housekeeping data. The personal message page numbers are used by the decoder to select appropriate teletext lines from subsequently broadcast frames. The fourth addressed packet format shown at 84 is a memory patch address packet, which is used to modify the memory contents of a particular decoder, for example, in the event of a change of address or to correct certain fault conditions.

2. Teletext Communication a. Features

There are a number of important objectives of the of the invention which have a communications system direct impact on the design of the teletext communication format employed. One of the most significant features is the fact that teletext messages to be displayed are to be selectable in several ways to provide flexibility to the system. For example, it was deemed highly desirable that the system be "menu-driven," that is, that the user be provided with screens showing pages, diagnostic messages, programming schedules and the like, and that he be able to readily move through them at his own option. In order that the decoder can be economically manufactured, the large quantity of data required to provide the many screens required cannot be stored at the decoder. Therefore, as much of the data as possible is stored at the transmitter location. On the other hand, because it is highly undesirable that a continuous uplink or landline connection be provided between the decoder and the transmitter, i.e., to allow the decoder to cause the transmitter to send particular data needed, all this information has to be made available to the decoder on a regular basis, such that it can select the data it needs to construct the various personal messages, menu pages, billing status pages and the like which are desired. Therefore, the teletext messages, at least as insofar as they are identical for all subscribers, are transmitted repetitively, and the decoders are enabled to select those which they require, for example, in order to respond to the user's commands as input from a key pad.

It is also important that the decoder itself be able to initiate messages. Because the decoder performs the billing function and retains all information relating to the current billing status of the subscriber, the decoder must be able to construct a screen message to display this information to the subscriber as needed. As above, it was considered undesirable to store all the information needed to generate a text screen at the decoder, as this would have been prohibitively costly of memory. Instead, only the user-specific data is stored at the decoder; the decoder selects the proper template for display of billing information from those regularly transmitted as teletext pages, and completes it by insertion of the user-specific information.

Finally, it is important that the system itself be able to urge a teletext message upon the decoder and hence on the viewer, for indication of emergency conditions, for announcing changes in service, and for providing personal messages to the subscriber, among other reasons. In a particularly preferred embodiment, such broadcaster-initiated messages can be "forced," that is, so that they are displayed immediately upon actuation of the user's television, or can be "unforced", such that the user is provided with an indication that a message is waiting, but is not obliged to view it immediately.

b. Summary

These diverse uses and objectives of teletext communication are achieved by the present invention, according to which teletext is transmitted in a bipartite format. Teletext according to the present invention is transmitted in the form of a number of text lines or rows, making up a page of text. The rows making up the page are preceded in transmission by a teletext header. The header indicates the fact that a teletext page follows and indicates its page number. A decoder looking for a particular page number, for example, a template page, scans the teletext page numbers provided in the teletext headers for the particular page of interest. When the page number sought is detected, the decoder then selects the following page, that is, selects for storage all the teletext lines which follow until the next teletext header line is identified.

c. Line Formats

FIGS. 10 and 11 show respectively the formats of the teletext header and text lines. In FIG. 10, the teletext header 90 is shown as comprising a thirty-two bit teletext identifier 92. This field simply indicates that this particular line of the vertical blanking interval is a teletext line, as opposed to, for example, an addressed packet. The next thirty-two bit area 94 contains various control flags, which are discussed in detail below. The teletext header then contains a 128 bit field 96 which identifies the number of the page which is comprised by the following text lines. In the preferred embodiment, the page number is a sixteen bit number, each bit of which is encoded as a eight bit byte. The flags 94 are similarly encoded; that is, a flag which is either a "1" or a "0" data value is nevertheless encoded as an eight bit byte for transmission, so as to enable its correct detection more probable than if it were simply a single bit flag. For the same reason, the page number is a 128-bit word in which each eight bit byte indicates whether the corresponding bit is a 1 or a 0, again for extremely reliable detection of page numbers. Finally, the last 165 bits 98 of the teletext header 90 are not used.

The flags 94 include a header flag 94a which indicates whether the teletext line is a header or is not, a linked page flag 94b indicating whether the subsequent page of teletext is one of a number "linked" or related to the present page, an encrypted page flag 94c indicating whether the subsequent page is encrypted or not, and a box page flag 94d indicating whether the text shown in the subsequent page should be displayed against a video background or a black background.

The significance of the flags is as follows. The header flag 94a simply indicates whether a particular teletext line is a header or is a line of text. The linked page flag 94b is used to signify to the decoder that a subsequent page contains data needed to complete the message begun in the present page. For example, if a teletext message is too long to fit into a single page comprising twenty 40-character lines of text, the user typically will desire to see the subsequent text page. The linked page flag 94b is used to alert the decoder to this fact and to cause it to copy the page of text having the next higher page number into a random access memory, such that if the user then indicates that he wishes to see the subsequent page of text, it is already stored in the random access memory. In this way, the entire message can be displayed more or less immediately, as opposed to waiting for a subsequent transmission of succeeding pages, which may not occur for on the order of several minutes in a very busy system. The linked page flag 94b thus provides an opportunity to improve the teletext service to the user. More particularly, any number of pages can be linked to provide lengthy text messages, e.g., stock price quotations or the like, which can efficiently be read in sequence.

The encrypted page flag 94c indicates whether the text found in the subsequent text lines making up a page is encrypted or not. In many cases, of course, there is no reason to encrypt the teletext, for example, the message is not private, or if its loss will not be damaging to the system integrity, as would be, for example, the loss of control over a first-run motion picture or the like. Hence, many teletext lines are not in fact encrypted.

Finally, the box flag page 94d indicates to the decoder that the teletext in a subsequent page is to be superimposed over whatever video is on the screen at the time, instead of being displayed against a plain background. This flag is useful for several purposes. For example, closed-captioned teletext, providing lines of dialogue and the like so that the hearing-impaired can follow the text of a film, is clearly best provided in this way, such that a viewer can simultaneously see the text and the video. On the other hand, important system messages, such as warnings of community dangers and the like, may be more dramatically or effectively presented against a plain background. Hence, this option is provided and is As mentioned, each of the four flags 94 is transmitted as an eight bit byte rather than as a single bit flag, to render the detection and decoding process more robust to reduce overall system errors. As mentioned, the bits making up the page number, which identifies the succeeding page of text, are similarly encoded, such that a sixteen bit page number occupies 128 bits of the teletext header.

FIG. 11 shows the structure of an individual text line 100 up to twenty of which may make up a page of text. As in the case of the teletext header of FIG. 10, the first thirty-two bits 102 of the text line 100 are a teletext identifier. These are identical whether the teletext line is in fact a header or is a text line. The next eight bits are a header flag 104, which is identical to the header flag comprised by flags 94 of the header line 90, that is, it is an eight bit byte indicating that the teletext line is in fact a text line 100 and not a teletext header 90. The following 320 bits are devoted to the transmission of forty bytes of textual data. Typically, these are encoded according to the usual ASCII standards, whereby each byte is seven bits of data plus a parity bit for error detection. Thus, each text line transmits forty characters which may be any alpha-numeric character found in the ASCII character set. The last seventeen bits 108 are not used.

Thus, in practice, the broadcast transmitter transmits a sequence of teletext lines in lines 9-13 of the vertical blanking interval (see FIG. 5). Up to twenty text lines 100 may follow each teletext header 90. The teletext header 90 contains a page number 96 which identifies the following text lines as, for example, belonging to a template useful in displaying billing status, or as including, for example, information concerning the current movie being run, that is, describing its title, its lead characters, its length, and the price the subscriber will be charged for viewing it, or the like. It will be appreciated, therefore, that the teletext lines in any given vertical blanking interval may be all text lines 100, since only five teletext lines can be transmitted in a vertical blanking interval. (It will be appreciated by those skilled in the art that this numerical limitation relates to a 525-line NTSC-type signal; the actual numbers of the lines in the VBI are different in the PAL type 625-line system.)

3. Message Origination

Figure 12:
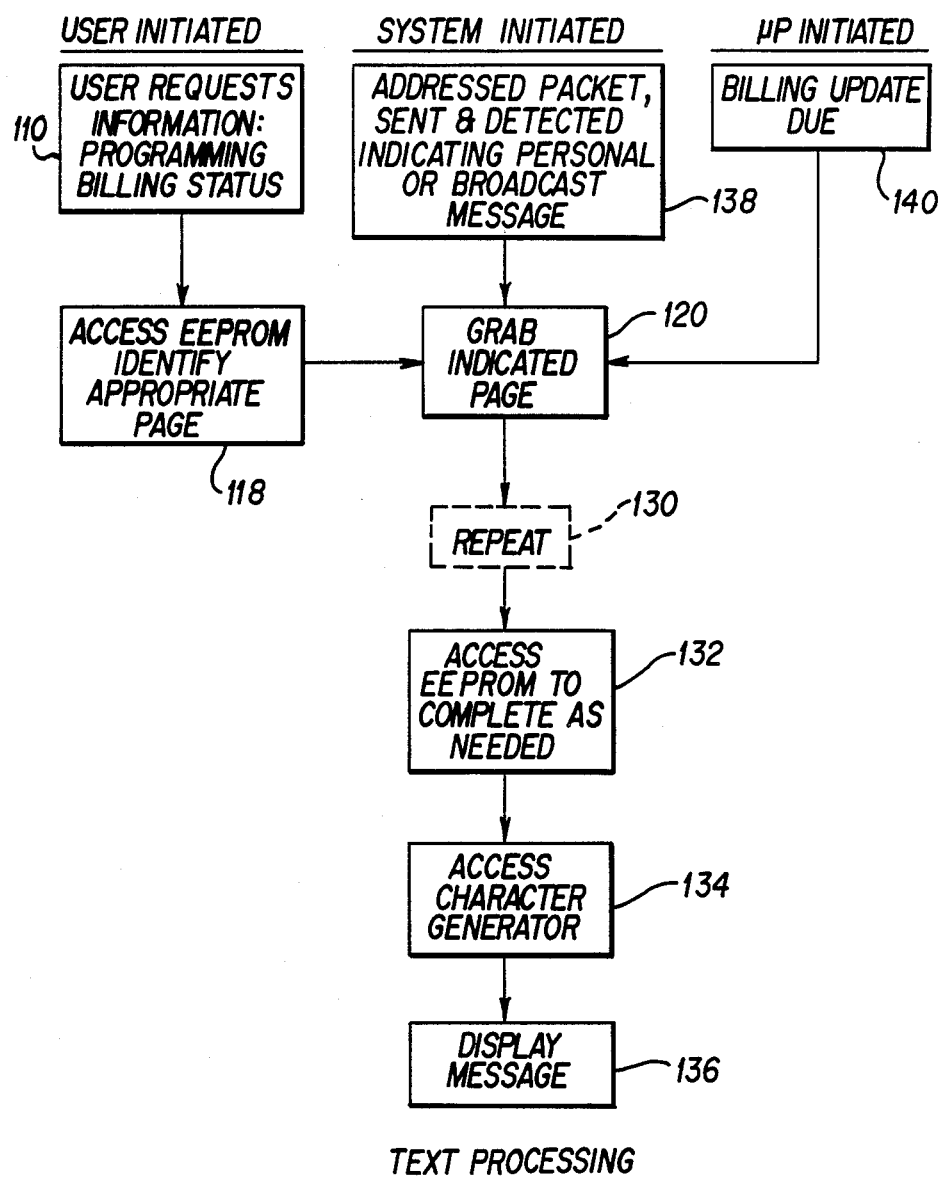
FIG. 12 shows schematically the text processing steps performed according to the system of the invention, when it is desired that a particular message be transmitted to an individual subscriber.
Figure 13:
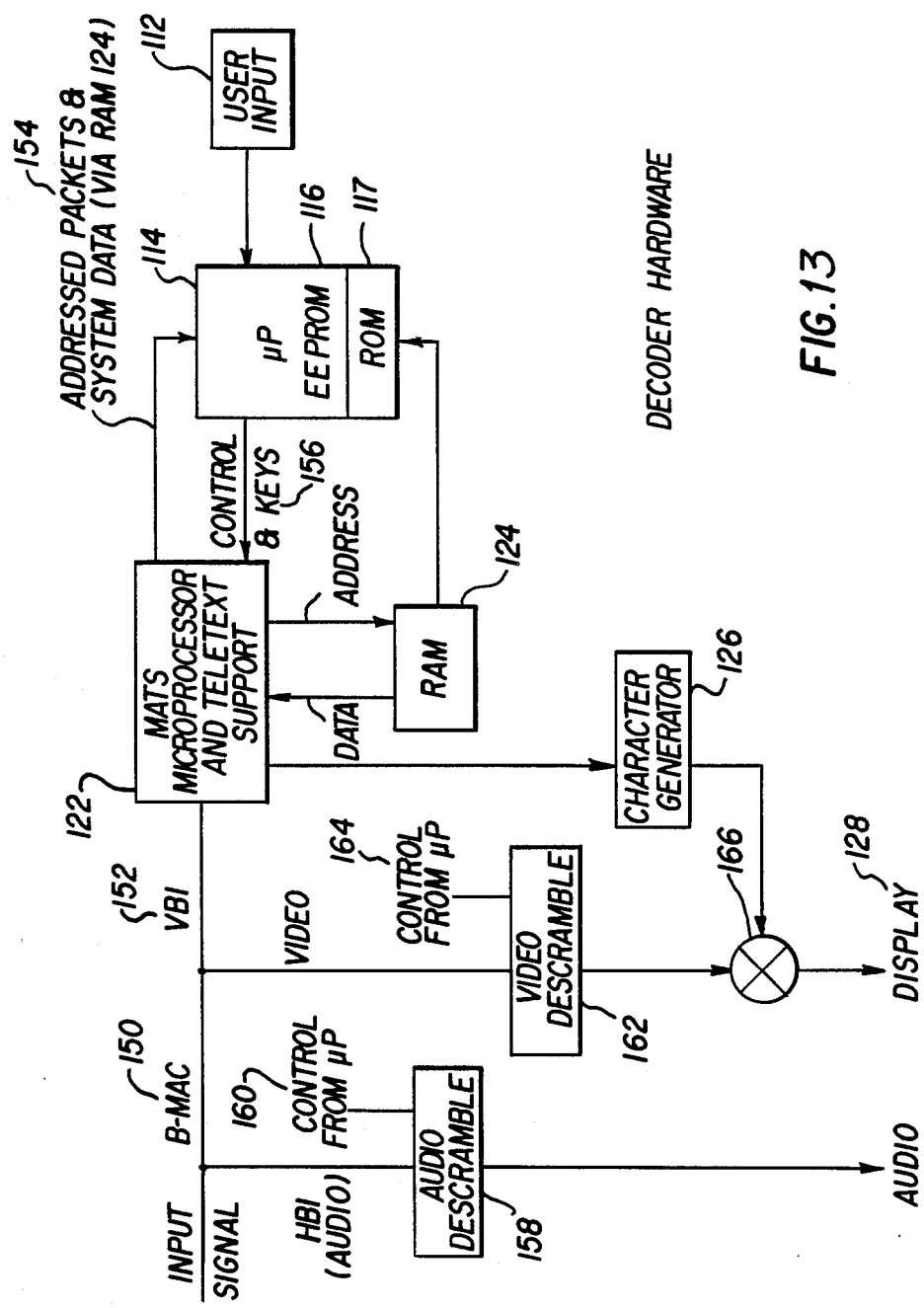
FIG. 13 shows in schematic form the hardware of the decoder significant to understanding the present invention.

FIG. 12 indicates in flowchart form the steps taken which result in the display of a teletext message on a subscriber's television screen in the system according to the invention. FIG. 13 shows in schematic form the hardware of the decoder which is used to perform this function, as well as the ordinary video processing. The following discussion of teletext processing may benefit from simultaneous consideration of both figures.

As mentioned above, in a preferred embodiment of the invention, a teletext message can be generated in response to a user-initiated request, in response to the decoder determining that a particular message should be given to the subscriber, or in response to the broadcaster's transmitting a message to the individual subscribers. FIG. 12 shows how these three forms of initiation of a message all result in a display thereof. The user-initiated service path begins on the left side of FIG. 12 at 110. For example, suppose the user wishes to see on his screen the current program material being transmitted, or wishes to check his billing status. He presses the appropriate key or combination of keys of a key pad, as indicated at 112 of FIG. 13. The decoder comprises a microprocessor indicated at 114, which accesses an electrically erasable programmable read-only memory (EEPROM) indicated at 116 to determine which teletext page number provides the appropriate template for this information, as indicated at 118. In the preferred embodiment, the microprocessor 114 is a "secure" microprocessor, meaning that it cannot be tampered with or its software read out or altered without destroying it, and the EEPROM 116 is comprised therein. As indicated at 120, the decoder then "grabs" the indicated page when the teletext header including the appropriate page number is received, by "grabbing" the teletext lines which follow the teletext header thus identified.

As shown in FIG. 13, the microprocessor 114 is assisted in its operations by a chip referred to as MATS 122, these letters being an acronym for Microprocessor and Teletext Support. In the preferred embodiment of the invention, MATS 122 receives the page number from the microprocessor 114 and compares all incoming teletext header page numbers with this number. When MATS 122 detects a coincidence, it then copies all succeeding text lines until a further teletext header is detected, and stores these text lines in a random access memory (RAM) 124. It subsequently causes these to be read out and passes them to a character generator 126, which integrates them with the video signal and displays these on the subscriber's television as indicated at 128.

As indicated at 130 on FIG. 12, in a preferred embodiment, the step of grabbing independent pages is repeated. This is to ensure that the teletext page lines are correctly received. In a particularly preferred embodiment of the communications system of the invention, all teletext pages are transmitted in duplicate, one header being followed immediately by its corresponding text lines and a second identical header, which is then followed by the same lines of text, so that this second step of grabbing the communicated page 130 can be repeated at once rather than waiting for a subsequent transmission of the same page, which might take place on the order of seconds later. The idea, of course, is to serve the user's convenience. The second copy of the page is stored at the same location in RAM 124 as the first, such that any blanks in the first copy which were caused by parity errors in the teletext data portion 106 (FIG. 11) will be completed, on average, by the second grabbing of the same information.

Should the page grabbed at 120 have been a template page, subscriber-specific information is needed to complete the display. For example, if the user requests a billing status update, the page grabbed will include such things as column headings, and the titles of various data items forming part of the billing display. For example, it might list the last 10 programs in a row purchased, total the prices paid, subtract this from the outstanding balance at the last credit information request, and display a new balance. Such information as titles, e.g., "Programs Purchased," "Price Paid," and "Credit Balance," will be transmitted as part of the template. Such user specific data as the numbers of the programs purchased, the prices paid and the user credit information may be stored in the electrically erasable programmable read only memory 116 (FIG. 13) and can then be used to complete the template page as needed, as indicated at 132. The complete ASCII encoded stream of bits is then supplied to a character generator 126, as indicated generally at 134, which in turn is used at 136 to supply a complete video signal to the display unit 128.

FIG. 12 also shows as mentioned the steps taken when the system initiates the display of a message on the user's television screen and when the decoder initiates such a step. For example, suppose the broadcaster wishes to send a particular subscriber a personal message, or wishes to announce an increase in the price of a service, the availability of a new service, or the like. At 138, the transmitter causes an addressed packet to be sent indicating that a personal message is available at a particular page number. For example, the addressed packet format shown at 82 of FIG. 9 would typically be sent. The MATS 122 in this case would recognize the subscriber's identification number in the addressed packet, and send it to the microprocessor. The microprocessor will then return the page number to the MATS 122 which can thereafter grab the indicated page as shown at 120 and process and display the message as above.

As mentioned above, in some cases it is considered desirable that a personal message or broadcast message be "forced," that is, immediately displayed upon the user's next turning on his television set, or superimposed over any programming which he might presently be viewing. In such a case, a "forced message" bit is set in the addressed packet indicating that a teletext message is being sent to the subscriber. This is detected by the microprocessor in decoding the addressed packet and is used to control the display of the teletext accordingly. In other cases, if this bit is not set, the microprocessor may simply alert the subscriber that a personal message has been received, e.g., by lighting a lamp on the control panel; he may then view the message when convenient for him.

A third method of initiating a message is shown beginning at 140 of FIG. 12. In this case, the microprocessor initiates the message. For example, when it detects that the subscriber's credit level is running relatively low, it may alert. him that he should arrange for increased credit by sending the broadcaster a payment. Thereafter, of course, the broadcaster will transmit an addressed packet to the decoder, which is detected by the microprocessor and used to update the billing records. In this case, a microprocessor selects from a ROM 117 the page number of an appropriate template for displaying to the user his billing status. ROM 117 stores the microprogram run by the microprocessor. The microprogram effectively responds to the user inputs, and provides the various text page numbers required for response to user requests. The microprocessor sends the selected page number to MATS 122. MATS 122 thereafter compares the page numbers of all incoming teletext pages until it detects this particular page. When it does so, it copies this template into RAM 124. The page is then completed by insertion of the user-specific information into the template and display at 136.

It will be appreciated that there has been described an extremely flexible method of providing individually addressable teletext messages to a subscriber in a subscription television system. Additional possibilities and features can now be discussed as well. For example, the user initiated teletext scheme disclosed in connection with FIG. 12 at blocks 110 and 118 indicates that the user may initiate teletext display by pressing a button on a key pad causing the decoder to then select appropriate messages from the broadcaster. Another possibility would be "pay-teletext" in which the user would select teletext information as one of his ordinary tiers of programming material. For example, such information might include financial quotations, electronic bulletin boards, flight information, computer shopping services, various sorts of information retrieval, and other forms of information in which the user can select items from a database using a menu-driven system. Of course, the system is limited as compared to an interactive database by the fact that the decoder is only permitted to display messages selected from those sent by the broadcaster; the messages sent by the broadcaster are not transmitted responsive to specific requests from the decoder, as in the case of conventional remotely accessible database management schemes. However, it is believed that such "pay-teletext" may nevertheless have utility in cases where the amount of text to be viewed is relatively limited. For example, the user might select Wall Street or Chicago Board of Trade quotations, or world-wide gold prices from a menu of a wide variety of financial information services. "Pay teletext" could also be used to provide individuals with access to Rueters, United Press International, Associated Press and other news gathering services not generally available to the public. According to the present invention, such a pay teletext scheme could be very simply implemented using the addressed packet/teletext transmission arrangements previously discussed.

To conclude the discussion of FIG. 13, the B-MAC signal is input at 150. The data contained in the vertical blanking interval (VBI) is passed to MATS 122 as shown at 152 for processing as discussed above. The MATS examines the user number of the addressed packets and supplies those bearing the correct number to the microprocessor. The addressed packet and system data are directed as shown at 154 to the microprocessor 114 for generation of control signals and decryption keys, transmitted at 156 to the MATS. Meanwhile, the remaining portions of the vertical blanking interval data, the teletext material, is processed by MATS 122. In general, the teletext data is stored in RAM 124 and is subsequently supplied to the character generator 126 after decryption using the encryption keys provided at 156 by the microprocessor 114. As mentioned above, if a particular text header indicates the presence of a linked page, a second page of text will be selected by MATS 122 and stored in RAM 124 for supply to the character generator 126 upon request thereof by user input at 112.

FIG. 13 also shows schematically the processing of the audio information contained in the horizontal blanking interval (HBI). This is sent to an audio descrambling unit 158 which receives a control signal from the microprocessor at 160 for controlling access to any pay-audio services which may be provided by a broadcaster. Somewhat similarly, the video signal is sent to a video descrambler 162, which is also supplied by the control signal from the microprocessor at 164, providing the descrambling information necessary and preventing access of the subscriber to programs to which he is not entitled, using the information contained in the addressed packets, all as discussed above. The video signal is combined in mixer 166 with the teletext video from character generator 126 and supplied to a display unit 128 as indicated.

As indicated at the caption 154 in FIG. 13, the addressed packets and system data, separated from the remainder of the vertical blanking interval data by MATS 122, are supplied to microprocessor 114 via RAM 124. This is because, in general, the microprocessor 114 is much slower than the MATS 122, so that the RAM 124 is useful as a data buffer. In the embodiment of the system of the invention described above, each addressed packet is individually addressed and received. This places a limitation on the throughput of the system, that is, it limits the number of individual packets which can be sent. To alleviate this problem, a "bank addressing" scheme may be employed. In this embodiment, the decoders are divided into "banks" and are assigned to users having characteristics which make it likely that messages may be commonly addressed to them, for example, common time-zone residence, common language, etc. Each of the decoders in a bank responds to the same 28-bit user address, that is, each receives the same addressed packet. Further, each decoder in a bank has written to it at manufacture a six-bit member code. A bank-addressed packet includes a number of "packet enable" bits, each of which is assigned to one of the decoders of the bank. Thus, when an addressed packet is received, the member code is used to determine whether the corresponding packet enable bit is set; if so, the other addressed-packet functions described above are enabled. A single data bit can also be transmitted to each decoder similarly, as part of a second group of bits corresponding to the packet enable bits, transmitted in an addressed packet; again, the member code is used to identify the corresponding one of the second group of bits. In this way, a single message can be used to transmit differing single-bit data items to differing decoders.

C. The Decoder Function

Figure 14:
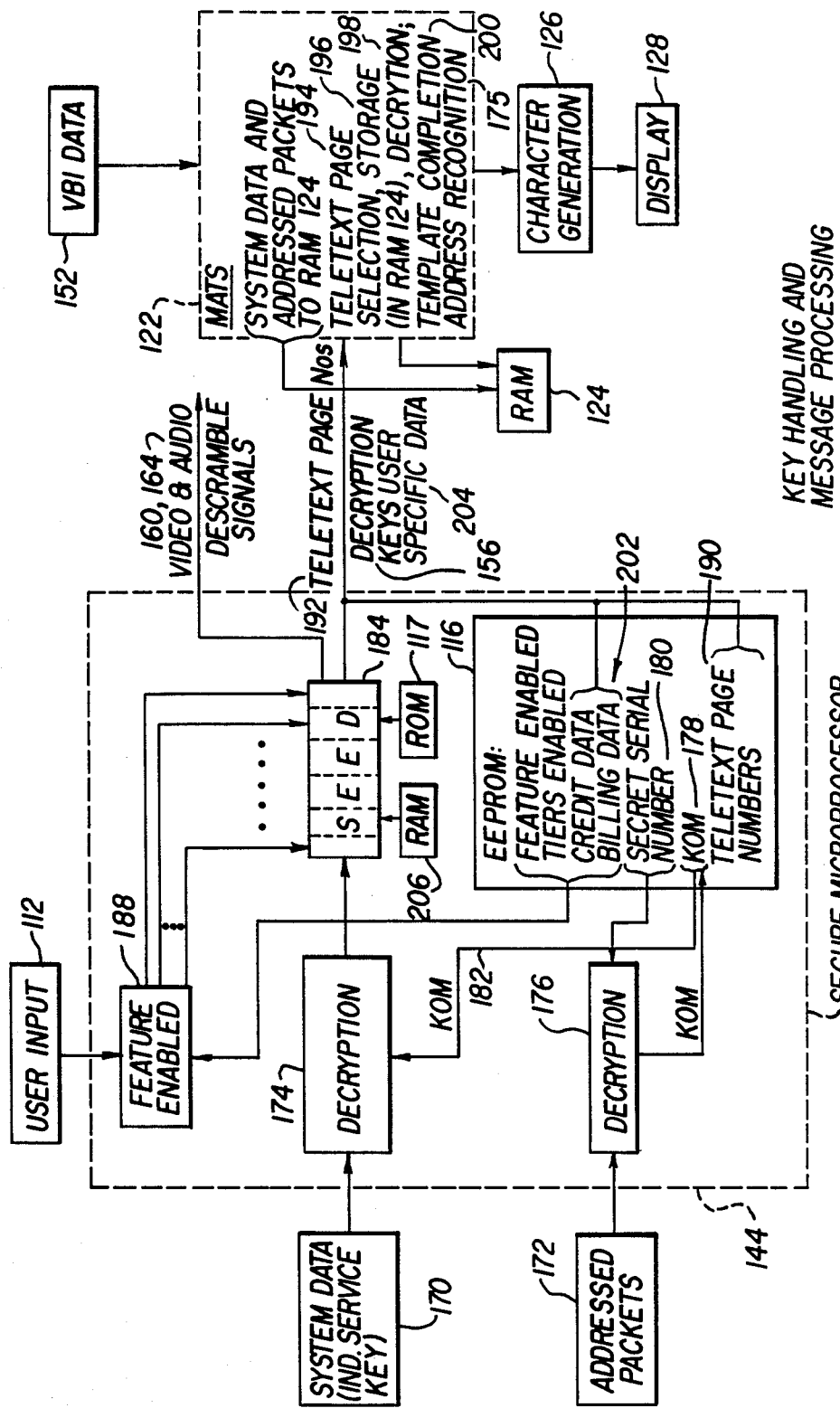
FIG. 14 shows in schematic form the handling of the keys and message processing steps performed, and further details how and where these steps are performed in the decoder according to the invention.

FIG. 14 shows the key elements of the decoder shown in FIG. 13 in significantly greater detail, and indicates in block diagram form the functions performed thereby. As discussed generally above, vertical blanking interval data indicated at 152 is supplied to MATS 122. At this point, system data and addressed packets are stored in RAM 124 for later accessing by the microprocessor 114 as indicated at 170 and 172, respectively. The system data taken from RAM 124 at 170 includes the service key, which as discussed above changes with every 16-frame cryptocycle, that is, each time a complete set of system data has been transmitted, all as discussed above.

The addressed packet data supplied to RAM 124 by MATS 122 is supplied at 172 to microprocessor 114. As mentioned above, the user address portion of the addressed packet, which as noted above is transmitted in clear text is compared by MATS 122 to a decoder identification number stored therein at manufacture, as indicated at 175. If the numbers match, such that the addressed packet is appropriate for processing by the particular decoder, the remainder of the addressed packet is supplied to microprocessor 114 as indicated at 172 and decrypted at 176 using a secret serial number which is stored in the electrically erasable programmable read only memory (EEPROM) 116 at manufacture of the device, as indicated at 180. Preferably, a bar coded label is attached to each microprocessor chip at manufacture. An assembly worker wands the bar coded chip so that this bar code identification is supplied to an associated computer device. Thereafter, the computer associates a secret serial number with that decoder number, without requiring operator intervention. The computer then writes the secret serial number to the EEPROM 116. The correlation between the decoder identification and the secret serial number stored in EEPROM 116 is critical to the proper functioning of this system. Therefore, this information is guarded very carefully.

The output of decryption unit 176, in addition to the other data contained in the addressed packets as discussed above, includes the key-of-the-month (KOM), which as mentioned is transmitted repetitively over a period of a month, and in advance of the month in which it is to be effective, all such that each decoder can obtain the key-of-the-month well in advance of its being required for decoding of program material. The odd and even KOMs are stored in the EEPROM as indicated at 178. The selected KOM is supplied as indicated at 182 to a further decryption unit 174 and is thereafter used to decode the system data. As mentioned, the system data is transmitted frequently and repetitively, on the order of every one-third second, to keep the system control data up to date.

As described in copending Ser. No. 883,310, filed July 8, 1986, the decoder can process system data from up to four broadcasters, one being selected by use of a broadcaster identification indication transmitted as part of the system data. Each broadcaster transmits at a different carrier frequency, so that the user chooses the "channel" in the conventional manner. The decoder then uses the broadcaster identification to identify the channel selected. Thus, in practice four sets of two keys-of-the-month are transmitted, four tier selections are stored, etc.

The output of decryption unit 174 is supplied to a "seed" 184. The seed 184 is intended to refer generically to means for generating a large number of control signals and decryption keys which are, in effect, the outputs of the microprocessor. For example, the seed output includes video and audio descramble signals supplied at 160, 164, respectively, to audio and video descrambler 158 and 162, respectively, as discussed above in connection with FIG. 13. Similarly, the decryption keys 156 are passed as indicated to MATS 122 for decryption of teletext data, such that personal messages can be decoded by the MATS from the encoded incoming VBI data 152.

The seed 184 also has as inputs to it a number of signals from a device identified generically as feature enabling unit 188. This unit receives an input from the user input key pad 112 and also a number of inputs from the EEPROM 116. These latter inputs include such things as the tiers enabled, that is, the classes of programs which the subscriber is permitted discussed above, the system data 170 to watch. As supplied to the microprocessor 114 includes program tier data indicative of whether a program being broadcast at any given moment belongs to a particular tier. Therefore, the seed combines the tier data from EEPROM 116, via the feature enabled unit 188 and the system data input at 170, to determine whether to permit video descrambling, as indicated by the video enable signal 160. This tier data, as discussed above, can also be used to control access of the subscriber to teletext data which may be provided on a payteletext basis by way of supplying teletext page numbers to MATS 122.

Teletext page numbers are also supplied to MATS 122 when, for example, the user desires to view the programming guide. In this case, the microprogram run by the microprocessor, which is stored in a ROM 117 at manufacture, responds to the appropriate key pad input by sending the appropriate teletext page number to the MATS, as indicated at 192. Thereafter, as discussed generally above, the MATS 122 reviews the page numbers of all incoming teletext headers for the appropriate page number, and when it detects a match, grabs the subsequent text pages as indicated at 194. If the linked page flag indicates that the teletext message extends over more than one page, it selects plural teletext pages and stores those not immediately displayed, as indicated at 196, in RAM 124. If they are encrypted, as indicated by the encrypted page flag, it decrypts them, as indicated at 198, using the key supplied at 156. Finally, if the page is a template, it completes the template by inserting user-specific information, as indicated at 200. The user-specific information can include billing data stored in EEPROM 116, as indicated at 204; this may include credit data indicating the user's credit status, billing data including, for example, what programs he has recently purchased, should he desire to review his purchases, and the like, all generally as indicated at 204.

The secure microprocessor 114 may also include within it a relatively small RAM indicated at 206. This can be used to store data which is permitted to be volatile, that is, lost upon power-off of the unit, unlike the data which is stored in the EEPROM, which is retained even if power is lost to the unit. Data suitable for storage in RAM 206 includes such things as the user's selection of audio channels, and other user-selectable data.

D. Decryption

Figure 15:
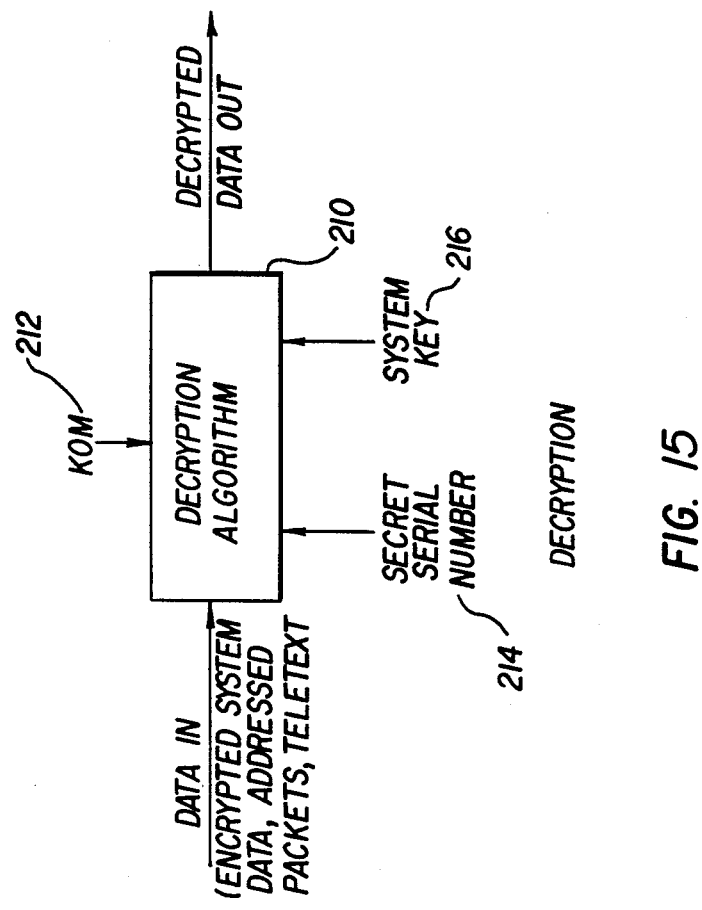
FIG. 15 shows in schematic view the data decryption arrangement employed.

FIG. 15 shows in schematic form the decryption of incoming data. The incoming data is supplied to a decryption algorithm as indicated at 210, as is one or more keys. The keys may comprise one of the several keys-of-the-month stored in EEPROM after supply to the decoder as part of an individually addressed packet, as noted at 212, the secret serial number stored in the microprocessor at manufacture, as noted at 214, and/or the system key transmitted as part of the system data in line 3 of the VBI, as noted at 216.

The algorithm itself may comprise any one of a wide variety of decryption algorithms known to those of skill in the art, including that corresponding to the Data Encryption Standard ("DES") published by the National Bureau of Standards. The algorithm chosen is immaterial to the practice of the present invention. Suitable encryption techniques are similarly within the skill of the art. In the decoder, the decryption is effected most expediently in the microprogram processed by the microprocessor 114.

E. Further Advantages

The overall operation and design of the system of the invention having been described, and the decoder having been detailed, a number of additional aspects, objects, improvements and advantages of the system and decoder of the invention can now be explained more fully.

As discussed above, decryption of the complete B-MAC signal used according to this invention requires the secret serial number, which is written to the secure microprocessor at construction of the decoder, the service key, and the key-of-the-month. Probably the most vulnerable part of this sequence is the key-of-the-month, which is transmitted frequently over a month's time. However, as noted, this capture of the KOM itself would not be adequate to decode the signal, since the service key and the secret serial number must also be captured. Moreover, the service key is 16 frames (approximately every one-third second) such that capturing it will only itself allow loss of 16 frames. This also has the advantage that the time required for key acquisition following a channel change is limited to this period of time, e.g., one-third second. Therefore, the subscriber does not see a substantial delay when he changes channels on his decoder.

As mentioned above, there are two types of control data transmitted according to the invention. A first type referred to as system data is intended for all users and is transmitted in every 16-field crypto-cycle. The system data contains information which fully describes the services currently being transmitted. These include such matters as broadcaster identification, program number, program cost, program tier membership required to view a given program, current service keys and so forth.

By comparison, addressed packets are encrypted uniquely for an individual decoder, and contain individual-subscriber or user-specific information which fully describes the authorization of the decoder with respect to a specific broadcaster or broadcaster consortium for a given month. A number of broadcasters or broadcaster consortia may independently address the decoder [broadcaster consortia are broadcasters which have banded together to bill their services commonly], and maintain entirely separate billing systems. The addressed packets contain information such as consortium/broadcaster identification, message identification, authorized individual program numbers, authorized service tiers (text, audio, etc.), and credit updates.

Both types of control data packets, that is, system data and addressed packets, are encrypted during transmission using a highly secure algorithm. They are only decoded in a secure microprocessor which cannot be tampered with without destruction. The products of decryption are also stored in the EEPROM, which cannot be read, due to the construction of the secure microprocessor, detailed below. The contents of the system data packet, which specifies the on-air program tier, are then compared with the authorized tier for the particular decoder (which are decrypted from an addressed packet on a monthly basis). The services which are authorized for reception by the decoder are derived from this comparison. Impulse purchase, wherein the subscriber specifically indicates to the decoder that he wishes to purchase a single program, is also possible; in this case, the decoder simply bypasses the tier comparison. The appropriate service keys are then decrypted and released from the secure microprocessor for use in decoding the video and audio signals. This process is repeated in each 16-frame cryptocycle.

The microprocessor used according to the preferred embodiment of the invention is referred to as "secure." This is because it is logically necessary for a subscription-television decoder to have an element of physical security. That is, if an unauthorized unit can be modified to be identical to an authorized unit, then the system is insecure, and the broadcaster will lose revenue. Preferably, the only difference between an unauthorized unit and an authorized unit is in the contents of one or more memories. This is because it is highly desirable to avoid having to provide physically different microprocessors, etc., for individual decoders. This would be highly cost-inefficient.

It is essentially straightforward to protect services during transmission by encrypting the service keys and by rapidly changing the service keys in a random manner. The main security problem arises in protecting the service keys from compromise during distribution.

For that purpose, a device is required with the following characteristics:
(1) capable of highly sophisticated decryption techniques;
(2) factory programmable;
(3) immune to modification or copying; and
(4) including protected non-volatile memory.

It is now a routine operation to copy conventional custom integrated circuits, and companies exist which specialize in this activity. Therefore, a non-copyable device is required. Specifically, a Motorola No. MC68HC11 microprocessor, originally developed for use in automotive applications and the like, which includes a protected internal non-volatile memory, is used for storage and processing of keys and credit information in the decoder of the invention. In a slightly different embodiment of the decoder, which is optimized for use in commercial applications, e.g. corporate in-house video communications and the like, the Motorola Model No. MC6870U5 is used instead. These commercial applications and the operation of the system of the invention in connection with them are discussed more fully in copending Ser. No. 883,310, filed July 8, 1986.

In a typical microprocessor, the address bus and data bus are available externally to be monitored and modified. Access can thereby be gained to the decryption process and to the contents of any memory connected to the bus. The processor used according to the present invention is operable in a secure mode in which the bus connection contacts are reassigned to other functions and in which the bus is not available externally for any purpose. In this condition, the internal non-volatile memory (the EEPROM) cannot be read by any known means. All input control packets can be securely encrypted. Decrypted service keys for the authorized services are released only for the microprocessor's immediate use, and are valid for only sixteen frames, that is, for approximately one-third second. Therefore, discovery of any particular decrypted service key is of minimal use. Within the microprocessor, the secure information is stored as a charge pattern and cannot be read, even using an electron microscope. The charge pattern is lost during any physical assault using probes.

Another important aspect of this according to the billing system and the user interface can be defined by software, such that the system can be modified "over the air" as needed by broadcasters without modification to the hardware.

As described above, the service data which is transmitted system-wide at cryptocycle intervals includes identification by service tier of the program currently being transmitted. The addressed packets, which are sent to each decoder from time to time, include tier identification, indicating which programs the individual subscriber is authorized to view. This provides substantial flexibility in programming control and in billing, because each subscriber can separately select those programs which he wishes to view. The choice is effectively among literally hundreds of different programs to be made available by a broadcaster or a consortium of broadcasters.

The tier concept also allows the subscriber to enjoy a temporary tier assignment. For example, when he wishes to watch a particular sporting event, he can contact the broadcaster and arrange to have that tier made available to him for the period of time required. According to an important aspect of the invention, the decoder is also enabled to respond to the pressing of a "BUY" button by the subscriber, to indicate that he wishes to purchase a particular program at a particular time; the subscriber's credit is then simply debited by the cost of the program.

All this is made readily possible and user-friendly by the use of the menu-driven user interface. That is, the fact that the teletext messages are continually being transmitted by the broadcaster and may be selected by the decoder in response to user or microprocessor initiated requests gives significant flexibility in the user/decoder interface. As discussed above in connection with FIG. 12, the provision of teletext pages selected by the microprocessor in accordance with the user's input from the key pad allows a properly programmed microprocessor to lead the user through a wide variety of sequences of screens, thus providing any control sequence deemed desirable to ensure that the various needs of the various users of the system are satisfied. The microprocessor selects the text pages displayed from the stream of pages transmitted, and uses the user's response to determine the next page to be shown.

For example, suppose the user wishes to have a babysitter watch his children in his house for the evening. The system can readily be provided with means requiring the input of a specific user identification number before it will accept input from a "BUY" button, such that the babysitter is prevented from purchasing a lot of expensive programs. The tiers can similarly be defined such that only authorized users can access certain classes of programs, e.g., X-rated movies, such that the user need not be concerned that his children are watching subject matter he considers inappropriate; he need simply input his personal user identification when he desires to watch such material.

Furthermore, use of the tier concept allows each broadcaster to define the program tiers in any manner he deems desirable; he is not constrained by system design to assign all first run movies to channel A, all blue movies to channel B, all high-priced sporting events to channel C, public television to channel D, and so on; the system can be reconfigured as needed. Moreover, the data stored in the electrically erasable programmable read only memory which controls the assignment of tiers, that is, the correlation between the buttons of the key pad and the programs which are viewed, can be varied by the broadcaster at any time through the use of the addressed packets. That is, an individual "memory patch" message can be sent to a decoder indicated that a particular item stored in the EEPROM is to be changed. The memory patch feature also permits updating of templates, as the EEPROM contains information concerning where certain user specific data is to be placed on the screen in conjunction with a particular template. In the same way, the actual data to be shown in connection with a particular template can be updated and the like.

Another improvement in control of the use of a copyrighted signal which is rendered straightforward by the method of the present invention is as follows. Those of skill in the art will recognize that, in general, it is possible for a subscriber with a video cassette recorder (VCR) to make a copy of substantially any program material transmitted. This has the obvious defect that the copyright proprietor tends to lose control of his subject matter. It is particularly exacerbated by the fact that at present there is no convenient way of locating the original copyist, that is, the individual who made the original copy of the copyrighted material using his VCR. According to the present invention, it is readily possible to set a "fingerprint" flag bit in the system data portion of the signal, which, when detected by the microprocessor, will cause it to write the subscriber identification number to the screen via the teletext processing facility. Typically, this will be done at a particular point in a particular program. Thereafter, the copyright proprietor, having located an illegal copy of his copyrighted work made during its transmission over the system of the invention, can readily detect the user's identification number and thus track down the maker of the offensive copy. At the same time, the insertion of the user identification on the screen for but a single frame is barely detectable to the subscriber's eye, such that no significant impairment in picture quality results from implementation of this expedient.

While a preferred embodiment of the invention has been described in detail, this should not be taken as a limitation on the scope of the invention, but merely as exemplary thereof. Numerous additional improvements and modifications can be made to the system of the invention as described above without departure from its essential spirit and scope. Therefore, the present invention is not to be limited by the above disclosure, but only by the following claims.

We claim:

1. In a subscription television system comprising a transmitter repetitively transmitting teletext template messages interspersed with video and a decoder for selectively receiving said teletext messages, a method for user-specific messages to a subscriber of said subscription television system the steps of:

generating and storing user-specific data in a first memory location in said decoder;

correlating said user-specific data stored in said decoder with specified prints for insertion of data into template messages transmitted by said transmitter, selecting ones of said template messages transmitted by said transmitter, and user-specified data selected in correspondence to selected ones of said templates, and displaying the template having had the user specific data inserted there at the specified points to the user as a video signal.

2. The method of claim 1, wherein said step of selecting a template is performed by said decoder in response to user input.

3. The method of claim 2, wherein said step of selecting a template in response to a user input is performed by said decoder in response to correlation of a specified user input code to a stored code indicative of a template appropriate for response to said user input, and for selecting a template corresponding to said stored code responsive thereto.

4. The method of claim 3, wherein if said template selected for appropriate response to user input comprises a message larger than suitable for display at a given time to a user, the additional steps of transmitting an indication with a first portion of said message that a subsequent portion of said message follows in a transmission sequence, and selecting said subsequent portion and storage thereof at said decoder are performed.

5. The method of claim 4, wherein said subsequent portion is selected and stored prior to any user input indicating that the user wishes to view the subsequent portion of the message.

6. The method of claim 1, wherein said template is selected in response to a determination made by said decoder that a particular message should be displayed to said subscriber.

7. The method of claim 6, wherein said determination made by said decoder is in response to evaluation of the credit or billing status of said subscriber.

* * * * *

UNITED STATES PATENT AND TRADEMARK OFFICE
CERTIFICATE OF CORRECTION

PATENT NO. : 4,829,569

DATED : May 9, 1989

INVENTOR(S) : NIGEL SETH-SMITH, ET AL.

It is certified that error appears in the above-identified patent and that said Letters Patent is hereby corrected as shown below:

On the title page, item [75], after "Lucas,", change "Ontario" to --Richmond Hill--.

Col. 2, line 66, after "mechanisms", insert --,--.

Col. 3, line 19, after "is", insert --,--.

Col. 5, line 61, "menudriven" should be --menu-driven--;

line 66, delete "of which the following is a Table of Contents".

Col. 8, line 17, delete "these";

line 23, "are" should be --is--; "bits" should be --bit--.

Col. 10, line 12, "are" should be --art--;

line 27, "of", first occurrence, should be --or--;

line 57, "en able" should be --enable--.

Col. 12, line 46, after "the", insert --communication system--;

lines 47-48, delete "communication system".

Col. 13, line 64, "a" should be --an--.

UNITED STATES PATENT AND TRADEMARK OFFICE
CERTIFICATE OF CORRECTION

PATENT NO. : 4,829,569

DATED : May 9, 1989

INVENTOR(S) : NIGEL SETH-SMITH, ET AL.

It is certified that error appears in the above-identified patent and that said Letters Patent is hereby corrected as shown below:

Col. 14, line 3, "1" should be --"1"--; "0" should be --"0"--;

line 60, after "is", insert --controlled by the box page flag 94d as noted.--.

Col. 15, line 28, after "subscriber", delete the period ".";

line 62, "read- only" should be --read-only--.

Col. 19, line 42, after "text", insert --,--.

Col. 20, line 41, after "permitted", insert --to watch. As--;

line 42, after "170", delete "to watch. As";

line 52, "payteletext" should be --pay-teletext--.

Col. 21, line 59, after "is", insert --obsoleted every--.

Col. 22, line 2, "crypto-cycle" should be --cryptocycle--.

Col. 23, line 1, delete paragraph indention at beginning of line.

Col. 24, line 3, after "significant", delete the period, ".".

UNITED STATES PATENT AND TRADEMARK OFFICE
CERTIFICATE OF CORRECTION

PATENT NO. : 4,829,569

DATED : May 9, 1989

INVENTOR(S) : NIGEL SETH-SMITH, ET AL.

It is certified that error appears in the above-identified patent and that said Letters Patent is hereby corrected as shown below:

Col. 25, line 24, after "video", insert --signals--;

line 27, after "system", insert --, comprising-- line 31, "prints" should be --points--;

line 35, after "and", insert --inserting--; "user-specified" should be --user-specific--.

Col. 26, line 4, "there" should be --therein--.

Signed and Sealed this

Thirteenth Day of September, 1994

Attest:

BRUCE LEHMAN

*Attesting Officer*   *Commissioner of Patents and Trademarks*